United States Patent Office 2,849,465
Patented Aug. 26, 1958

2,849,465
NEW COMPOUNDS AND METHODS OF MAKING SAME

David I. Randall, New Vernon, N. J., and Edgar E. Renfrew, Jr., Easton, Pa., assignors to General Aniline & Film Corporation, New York, N. Y., a corporation of Delaware No Drawing. Application September 25, 1956
Serial No. 612,071

13 Claims. (Cl. 260—404)

This invention relates to new and useful chlormethylated anilides and their methods of preparation.

While the chlormethylation of organic compounds is a very well developed field in organic chemistry, it is equally well known that many classes of compounds do not operate in the normal chlormethylation reaction to give chloromethyl derivatives. Among such classes of compounds are the aromatic amines. As pointed out in "Organic Reactions," vol. 1 (published by John Wiley & Sons, Inc.), page 66, it has not been possible to isolate simple chloromethyl derivatives of aromatic amines and it is further stated therein "These could hardly be expected to be stable. . . ." Notwithstanding this positive acknowledgment and well known fact of the inoperability of the general class of aromatic amines and, further, in view of the complete absence of any prior art relating to the use of anilides as precursors for the compounds and in the processes of this invention, we have unexpectedly discovered that a restricted class of aromatic amine derivatives, namely anilides, can be successfully chlormethylated in the anilide nucleus and the resultant products made useful in many fields of endeavor.

It is therefore an object of this invention to provide a process for the preparation of chloromethyl derivatives of certain aromatic anilide derivatives.

It is a further object of this invention to provide a process for the preparation of nuclear substituted chloromethyl derivatives of anilides.

It is a still further object of this invention to provide new and useful nuclear substituted chlormethylated anilides and methods for the preparation of same.

It is another object of this invention to provide mono- and polychlormethylated anilides chlormethylated in the benzenoid nucleus and process for preparing same.

Other objects of the invention will appear as the description proceeds.

The process of this invention pertains to the preparation of chloromethyl derivatives, that is, monochloromethyl or polychloromethyl of anilides, the latter having the following general formula:

wherein R represents an alkyl group such as methyl, ethyl, propyl, n-propyl, isopropyl, n-butyl, tertiary butyl, n-amyl, hexyl, heptyl, octyl, nonyl, decyl, undecyl, dodecyl, tridecyl, tetradecyl, pentadecyl, hexadecyl, heptadecyl, octadecyl, and the like, or an aryl radical such as phenyl, or a substituted derivative of phenyl such as chlorphenyl, bromophenyl and the alkylated phenyls such as tolyl, xylyl and the like, Ar represents a benzene nucleus which may contain one substituent such as alkyl, nitro or halo and/or no more than two additional lower alkyl substituents, that is, alkyl groups of from about 1 to 6 carbon atoms. In addition, the benzene nucleus should have at least one of the positions ortho or para to the acylamido group free of substituents.

The general process for the preparation of the compound encompassed by this invention involves the chlormethylation of the subject anilide with a solution of at least an equimolar amount of bis chloromethyl ether in sulfuric acid monohydrate which may or may not contain concentrated sulfuric acid (96% sulfuric acid). The mixture of the chlormethylating agent in the sulfuric acid is cooled to about —5° C. to +30° C. and preferably about 0° C. and the requisite amount of the anilide is then added slowly (or vice versa). Upon completion of the addition of the anilide the reaction mixture is maintained at about 5 to 25° C. and preferably 5 to 15° C., for several hours after which the mixture is poured into ice and water. A precipitate results which is isolated and purified in the usual manner and gives rise to the desired chlormethylated anilide. Where it is desired to obtain a monochlormethylated product, a mixture of sulfuric acid monohydrate and concentrated sulfuric acid of 96% concentration is employed. Polychlormethylated products are obtainable with such a mixture with certain anilides but with others it is necessary to employ the sulfuric acid monohydrate undiluted with any 96% sulfuric acid. The general reaction herein involved may be depicted as follows:

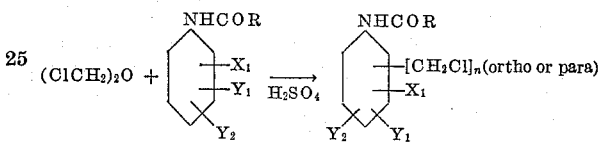

wherein R is as indicated above, $X_1$ represents hydrogen, nitro or halo, $Y_1$ and $Y_2$ represent hydrogen or alkyl, $n$ equals 1, 2 or 3 and at least one position ortho or para to the acylamino group is unsubstituted.

The process of this invention makes available in a simple and efficient manner valuable chlormethylated derivatives of amino-containing aromatic compounds. These chlormethylated derivatives are exceptionally valuable and useful as intermediates in the preparation of a great variety of types of compounds. Thus, by reacting the chlormethylated compounds with sodium cyanide and subsequently hydrolyzing the resultant product there are obtained substituted phenyl acetic acid and in particular phenyl acetic acids containing nuclear amino groups and additional substituents which may have been present in the original chlormethylated product (i. e., $X_1$, $Y_1$ and $Y_2$). By way of example, it is now possible to prepare substituted α-toluic acids from monochlormethylated ester anilides. The chlormethylated products resulting from the processes of this invention may also be employed to form new, useful and valuable quaternary compounds by reacting same with an appropriate tertiary base such as pyridine and the like. Such quaternary compounds are valuable cationic surfactants and many, furthermore, exhibit outstanding germicidal properties. Other of the compounds prepared by the processes of this invention, and in particular those anilides wherein R represents a long chain alkyl group of from about 12 to 18 carbon atoms form with tertiary bases quaternary salts which are outstanding water-proofing agents. It is also possible to prepare the isothiuronium salts from the chlormethylated derivatives in the usual manner from thiourea. These compounds are also excellent surfactants. The following examples will serve to illustrate the invention without being limitative thereof. Except as otherwise indicated, parts are parts by weight.

EXAMPLE 1

*Preparation of p-chloromethylacetanilide*

A suspension of 45.0 parts of bischloromethyl ether in a solution of 184.0 parts of sulfuric acid monohydrate and 36.9 parts of 96% sulfuric acid is stirred for 10 minutes. The mixture is then cooled to 0° C. and 27.0 parts of acetanilide is added in portions over a period of one-half hour. The temperature is maintained at 5–15° C. for two and a half hours. The solution is then poured into ice and water. The gummy material which precipitates is stirred 10 minutes, filtered, washed neutral, and then subjected to rapid stirring in cold water in a Waring blendor. This treatment eliminates nearly all of the tendency to gum. Yield 23.0 parts. The product after recrystallization from methanol has a melting point of 130 to 136° C. and analyzes for the theoretical amount of chlorine, which is 19.4%.

The para position of the chlormethyl group is proven by converting the chlormethyl group to a carboxy group and comparing the resultant benzoic acid derivative with p-acetamino benzoic acid. Melting point of the oxidized product is 247 to 252° C. A mixed melting point taken with a known sample of p-acetamino benzoic acid (melting point 242–250° C.) is 246–250° C. The oxidation of the chlormethyl compound is carried out as follows:

A solution of 10.0 g. of the chlormethyl derivative as prepared above, 5.0 g. of anhydrous sodium carbonate, and 270 cc. of water is heated to 55° C.; 27.0 g. of potassium permanganate is then added in small portions. Rapid oxidation takes place. The solution is then heated to about 80 to 90° C., held there for about a half hour, and then filtered. Excess permanganate is discharged with sodium bisulfite and the filtrate is again filtered. The resultant filtrate is then acidified with hydrochloric acid and a white precipitate forms. The mass is cooled over night and then filtered. The resulting product is p-acetamino benzoic acid identified as above.

EXAMPLE 2

*Preparation of 4-methyl-2,6-dichloromethylacetanilide*

A solution of 45.0 parts bischloromethyl ether, 212.0 parts sulfuric acid monohydrate, and 46.0 parts of 96% $H_2SO_4$ is cooled to 0° C. During a period of one-half hour 29.8 parts of 4-methyl acetanilide is added. The solution is allowed to stir at 5°–15° C. for two and a half hours whereupon it is worked up as in Example 1. Resultant yield 37.0 parts.

The dichlormethylated derivative as prepared by this example has a melting point of 188–194° C. The chlorine content found is 26.1%; calculated, 28.8%. This product reacts readily with tertiary bases to give the corresponding quaternary salts. Thus reaction with pyridine in the usual manner gives the pyridinium compound.

EXAMPLE 3

*Preparation of chlormethylstearanilide*

180 parts of stearanilide are dissolved in a mixture of 1850 parts of sulfuric acid monohydrae (100% acid) and 460 parts of 96% sulfuric acid at a temperature not more than 25° C. The temperature of the solution is then lowered to about 5° C. and thereafter there is added a solution of 953 parts of 100% sulfuric acid and 88 parts of bischloromethyl ether. The mixture is stirred for 2½ hours while maintaining the temperature at about 5–15° C. Thereafter the reaction mass is poured into ice and water, and the resultant precipitated material is collected by filtration and then washed with water, dilute sodium bicarbonate solution and then again with water. This product analyzes for the empirical formula $C_{25}H_{42}ONCl$. The monochlormethylated stearanilide as prepared above is reacted with pyridine in the usual manner to form the corresponding pyridinium compound which gives excellent results as a water-proofing agent on textile fibers such as cotton, wool and the like.

EXAMPLE 4

*Preparation of benzamidobenzylchloride*

197 parts of benzanilide is dissolved in 1850 parts of 100% sulfuric acid maintaining the temperature of the solution below 30° C. There is then added slowly 176 parts bischlormethylether. Stirring is then continued for about 4 hours at room temperature. The reaction mixture is then poured into ice and water, and the precipitate collected by filtration. The filter cake is vigorously stirred and washed with water, filtered and further washed to remove all traces of acid. Yield 175 parts. The product has an empirical formula $C_{14}H_{12}ONCl$; chlorine calculated 14.5%; chlorine found 14.7%. The monochlormethylated product prepared by this example dissolves in pyridine and gives upon gentle heating a precipitate of the resultant pyridinium base, the latter being soluble in water.

EXAMPLE 5

*Preparation of monochlormethyl-m-chloracetanilide*

The procedure of Example 2 is repeated except that 34 parts of m-chloroacetanilide are employed in lieu of the 4-methylacetanilide of that example. Yield 44.5 parts.

EXAMPLE 6

*Preparation of p-monochlormethylated N-acetyl-o-3-xylidine*

The procedure of Example 2 is again repeated employing the acetylated-o-3-xylidine (⅕ mole) in place of the anilide of Example 2. Yield 40 parts.

EXAMPLE 7

*Preparation of monochlormethyl lauranilide*

The procedure of Example 3 is repeated employing ½ g. molecular weight of lauranilide. The chlormethylated product as prepared by this example is reacted with pyridine in the usual manner to give a pyridinium compound which is excellent water-proofing material for textile materials such as cotton and the like.

EXAMPLE 8

*Preparation of monochlormethylated myristanilide*

The lauranilide of Example 7 is replaced by ½ g. molecular weight of myristanilide and again the resulting monochlormethylated products forms a pyridinium salt useful as a water-proofing agent.

EXAMPLE 9

*Prepaartion of palmitanilide monochlormethylated derivative*

The procedure of Example 7 is again repeated empolying the corresponding palmitanilide (½ g. molecular weight) in lieu of the anilide of the aforementioned example. The pyridinium salt of this reaction is again an excellent water-proofing agent for textile materials.

EXAMPLE 10

*Preparation of dichloromethylated m-propionotoluide*

The procedure of Example 2 is repeated employing ⅕ g. molecular weight of m-propionotoluide. The resulting product analyzed for 2-chloromethyl groups.

In addition to those compounds listed above in the examples, other compounds suitable for use in the processes of this invention for preparing mono and dichlormethylated products, there may be included the following:

o-Acetanisidide
p-Acetanisidide
N-acetyl-o-3-xylidine
N-acetyl-o-4-xylidine
N-acetyl-p-xylidine
N-acetyl-m-2-xylidine
N-acetyl-m-4-xylidine
N-acetyl-m-5-xylidine

*Preparation of quaternized compounds*

The general procedure for preparing the quaternized derivatives of the chlormethylated anilides of this invention follows techniques well known in the art for other quaternary preparations. Thus a suitable tertiary base such as pyridine, quinoline, picoline, lutidine, triethylamine, dimethylaniline, and the like, in a proportion of at least 1 mole thereof per mole of chlormethyl group is employed. It is preferred and more convenient to add the chlormethylated compounds to a considerable excess of the stoichiometric amount of base. About 10 times the theoretical equivalent amount of base is preferred and in this proportion the latter acts not only as a chemical reactant but also as a solvent or suspending medium. The mixture or solution is then gently warmed, for example, on a steam bath, for a few minutes and this completes the quaternization reaction. The resultant quaternary compound may be isolated in any of the well known ways and conveniently, simply by evaporation of the excess base.

EXAMPLE A 1 g. of the chlormethyl compound described in Example 1 is stirred into 10 cc. of pyridine. The mixture is then warmed gently on a steam bath for 5 minutes. Excess solvent is removed by simple evaporation and the resultant solid residue is a pyridinium compound of a chlormethyl derivative of Example 1.

EXAMPLE B

The procedure of Example 1 is repeated employing the chlormethyl derivative of Example 2 and quinoline as the tertiary base.

EXAMPLE C

Example A is repeated employing chlormethyl stearanilide and quaternizing it with pyridine.

EXAMPLE D

To each of two samples of benzamidobenzylchloride (1 g. samples) there is added on the one hand 10 cc. of pyridine and to the second sample 10 cc. of picoline. Quaternization in each case is achieved as described in Example 1, and the products isolated similarly as described therein.

As indicated above, the chlormethylated products obtainable by the processes of this invention may be either monochlormethylated or dichlormethylated products depending upon the particular anilide employed as the precursor for the chlormethylated derivatives and also depending upon the specific chlormethylating conditions and proportions. In general, the presence of methyl substituents in the aromatic nucleus of the anilide tends to increase the formation of dichlormethylated products whereas halogen and nitro substituents tend to favor the formation of monochlormethylated products. The absence of substituents other than the acylated amino group in general leads to the formation of monochlormethylated products but dichlormethylated products may usually be formed if the reaction is carried out over an extended time and preferably with 100% sulfuric acid as the carrier for the chlormethylating reagent.

We claim:

1. A method for the preparation of nuclear chlormethylated derivatives of anilides having the following formula:

Ar—NH—COR wherein R is a radical selected from the group consisting of alkyl, phenyl, halo phenyl and alkylated phenyl radicals, Ar represents a benzene nucleus containing at least one of the positions ortho and para to the amido group free of substituents which comprises treating the anilides at a temperature below about 30° C. with a mixture of bischlormethyl ether in sulfuric acid of at least 96% concentration.

2. A method as defined in claim 1 wherein the anilide is chlormethylated at a temperature of about —5 to +10° C.

3. A method of preparing a nuclear monochlormethylated derivative of a compound having the formula:

Ar—NH—COR wherein R represents an alkyl group and Ar a phenyl group which comprises treating the anilide with a mixture of at least an equimolecular amount of bischlormethyl ether in sulfuric acid of at least 96% concentration and at a temperature of from about —5° C. to +10° C. and thereafter isolating the resultant monochlormethylated anilide.

4. A method of preparing p-monochlormethylated acetanilide which comprises slowly adding acetanilide to a suspension of at least an equimolecular amount of bischlormethyl ether in concentrated sulfuric acid of at least 96% concentration which mixture has been precooled to about 0° C., maintaining the temperature of the reaction at about 5 to 15° C. for about 2½ hours and isolating the resultant p-chlormethyl acetanilide.

5. A method of preparing nuclear chlormethylated derivatives of anilides having the following general formula:

Ar—NH—COR wherein R represents an alkyl group, Ar an alkylated phenyl radical which comprises treating the anilide with a mixture of at least an equimolecular amount of bischlormethyl ether in sulfuric acid of at least 96% concentration and at a temperature of from about —5° C. to +10° C. and thereafter isolating the resultant monochlormethylated anilide.

6. A method of preparing 4-methyl-2,6-dichlormethyl acetanilide which comprises slowly adding 4-methyl acetanilide to a suspension of at least an equimolecular amount of bischlormethyl ether in concentrated sulfuric acid of at least 95% concentration which mixture has been precooled to about 0° C., maintaining the temperature of the reaction at about 5° C. to 15° C. for about 2½ hours and isolating the resultant 4-methyl-2,6-dichlormethyl acetanilide.

7. A method for the preparation of a nuclear substituted chlormethylstearanilide which comprises slowly reacting stearanilide and a mixture of bischlormethylether and concentrated sulfuric acid at a temperature of about 5° C. to 15° C. for about 2½ hours and thereafter isolating the resultant chlormethylstearanilide.

8. A process for the preparation of benzamido benzylchloride which comprises reacting benzanilide and an excess of bischlormethyl ether in the presence of 100% sulfuric acid at about room temperature and thereafter isolating the resultant chlormethylated anilide.

9. Nuclear chlormethyl derivatives of compounds having the following general formula:

Ar—NH—COR wherein R is a radical selected from the group consisting of alkyl radicals of from 12 to 18 carbon atoms, a phenyl radical, halophenyl radicals and alkylated phenyl radicals and Ar represents a benzene nucleus containing at least one of the positions ortho and para to the amido group free of substituents.

10. Nuclear chlormethylated lauranilide.

11. Nuclear chlormethylated stearanilide.

12. Nuclear benzamido benzylchloride.

13. A process for the preparation of nuclear chlormethylated lauranilide which comprises reacting lauranilide and a mixture of bischlormethyl ether in concentrated sulfuric acid at a temperature below about 25° C. and thereafter isolating the resultant chlormethylated lauranilide.

References Cited in the file of this patent

FOREIGN PATENTS

| 537,221 | Great Britain | June 13, 1941 |
| 554,717 | Great Britain | July 16, 1943 |